United States Patent [19]

Neuburger et al.

[11] Patent Number: 4,505,061
[45] Date of Patent: Mar. 19, 1985

[54] GRAPHIC DISPLAY

[75] Inventors: Werner Neuburger, West Nyack; Martin P. Gabor, Tuxedo Park, both of N.Y.

[73] Assignee: Datapic Systems, Inc., West Nyack, N.Y.

[21] Appl. No.: 492,702

[22] Filed: May 9, 1983

[51] Int. Cl.³ ............................................. G09F 11/00
[52] U.S. Cl. ..................................... 40/489; 40/622; 40/605; 40/10 R
[58] Field of Search .................. 40/472, 473, 489, 568, 40/622, 618

[56] References Cited

U.S. PATENT DOCUMENTS

| | | | |
|---|---|---|---|
| 2,357,430 | 9/1944 | Shaw | 40/568 |
| 3,026,512 | 3/1962 | Baker | 40/452 |
| 3,089,269 | 5/1963 | McKiernab | 40/622 |
| 3,258,870 | 7/1966 | Offenhauer | 40/622 |
| 3,358,078 | 11/1971 | Wittman | 40/573 |
| 3,358,395 | 12/1967 | Simonovic | 40/489 |
| 3,362,093 | 1/1968 | Joselevich | 40/452 |
| 3,608,222 | 9/1971 | Koch | 40/452 |
| 4,035,939 | 7/1977 | Dadian | 40/573 |
| 4,419,838 | 12/1983 | Taylor et al. | 40/622 |

*Primary Examiner*—Gene Mancene
*Assistant Examiner*—Wenceslao J. Contreras

[57] ABSTRACT

This invention comprises a display especially suitable for a large system, such as a utility distribution network diagram, a map, or the like, which is subject to frequent revision. The complete display is made up of a multiplicity of small display members arranged in abutting relationship, which can be revised and replaced individually as necessary to keep the entire display up-to-date, without the necessity of replacing the complete display. A frame having an array of apertures, each smaller than one display member, supports the entire display. Each display member has attached to its back at least one mounting unit which is removably receivable in one of the apertures in the frame.

4 Claims, 15 Drawing Figures

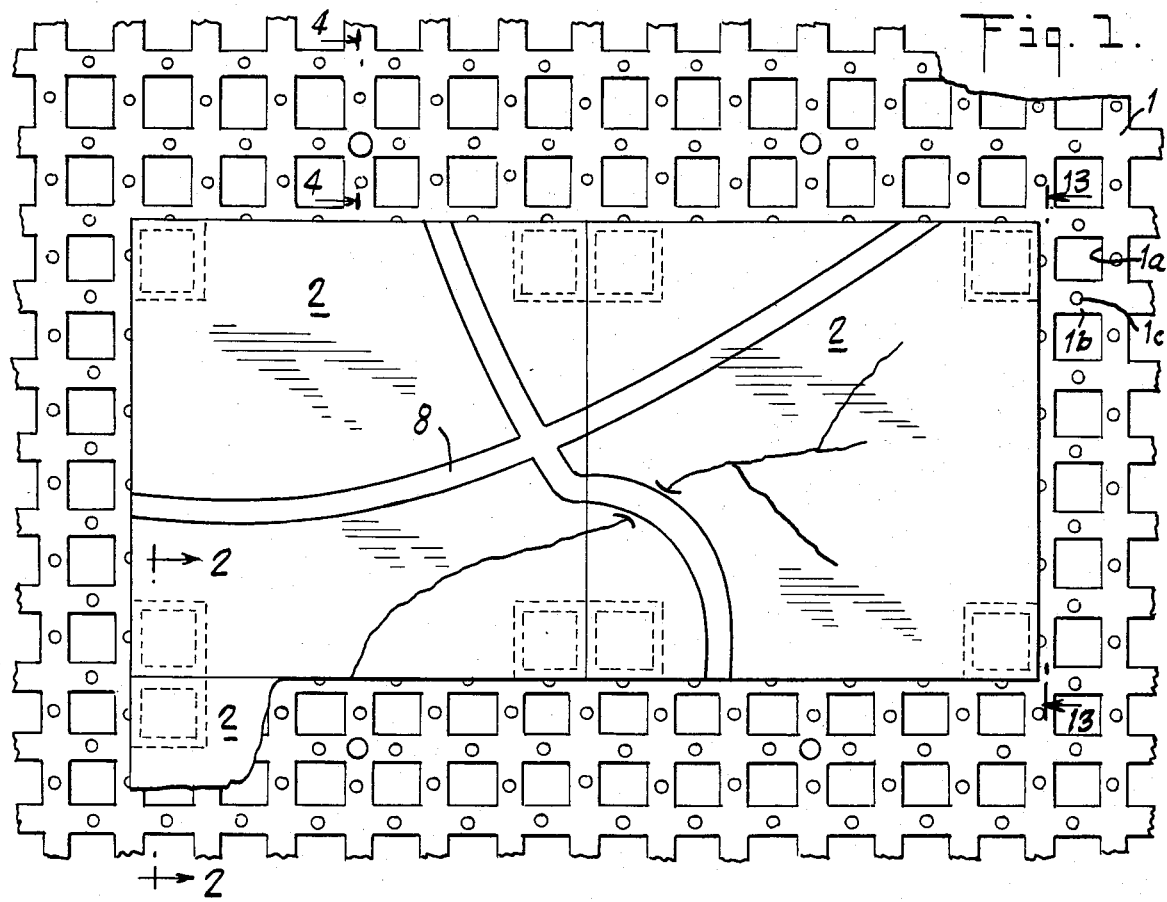
Fig. 1.
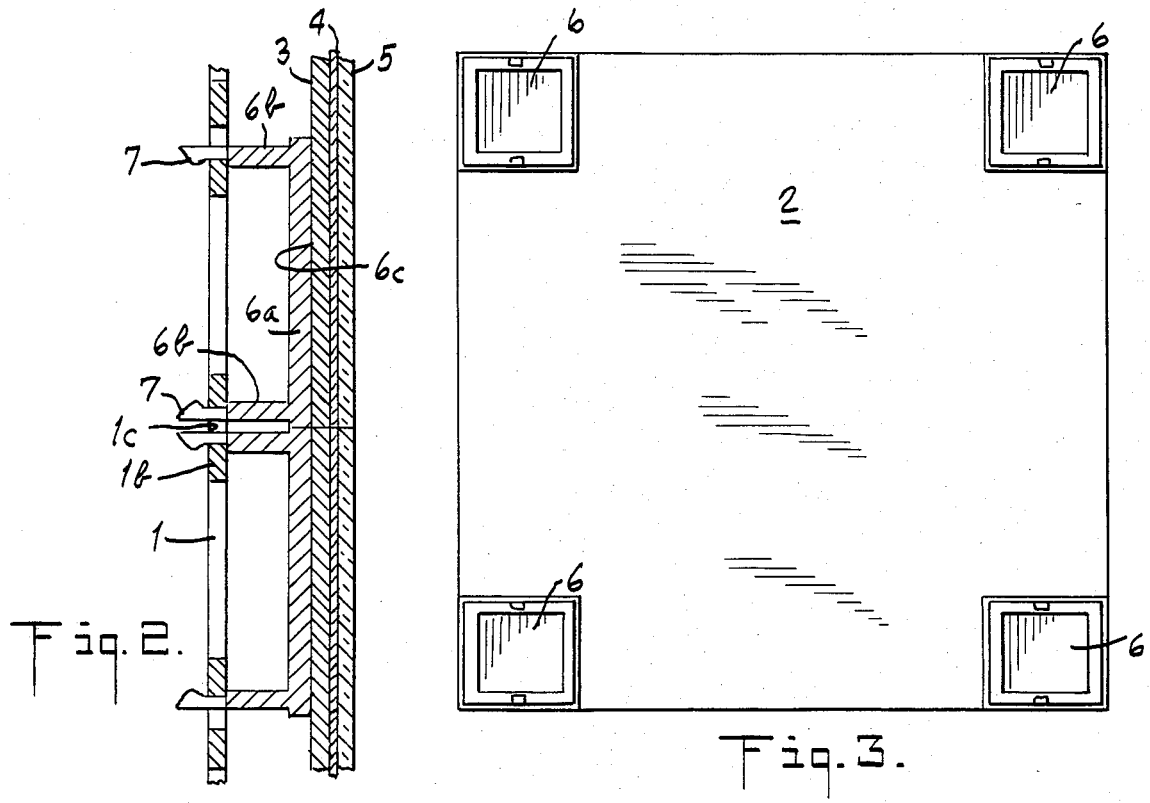
Fig. 2.
Fig. 3.

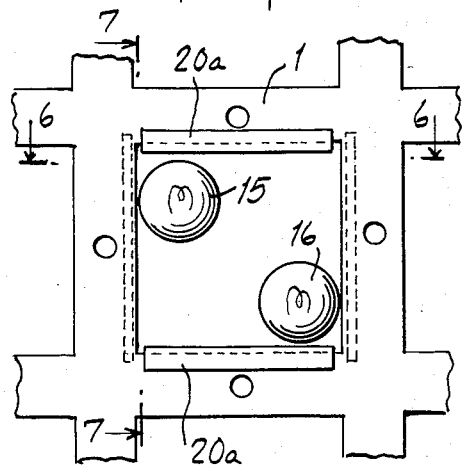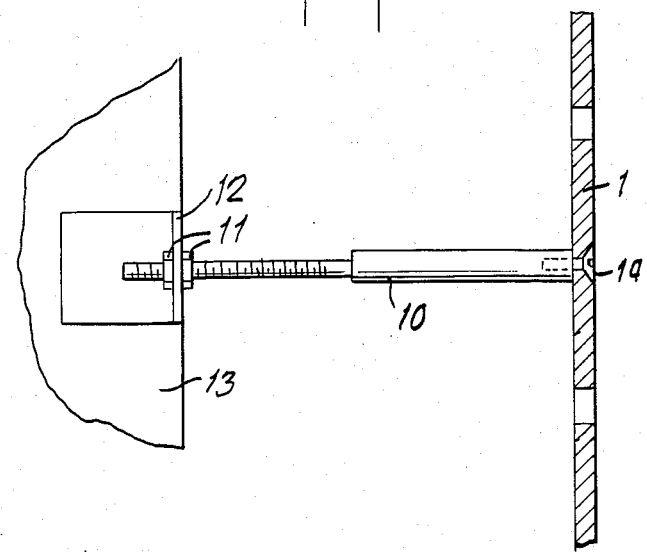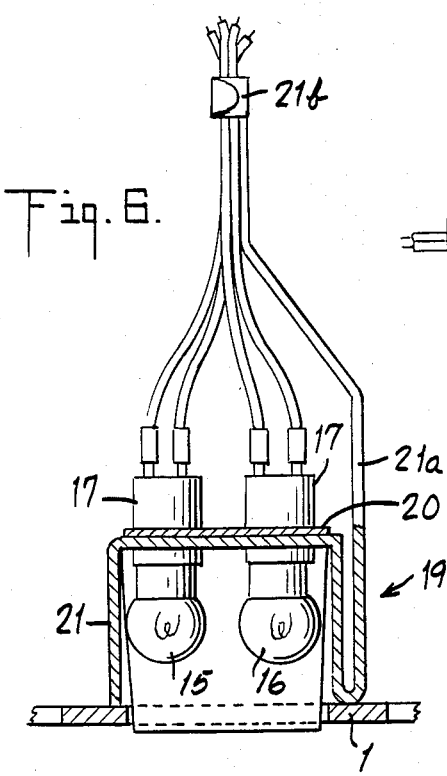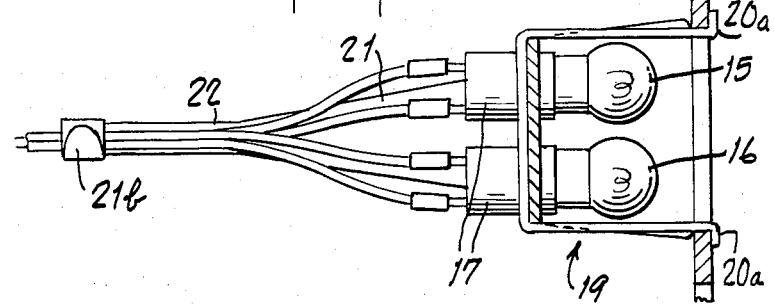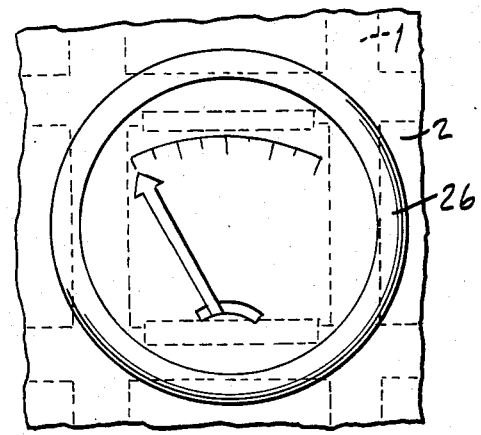

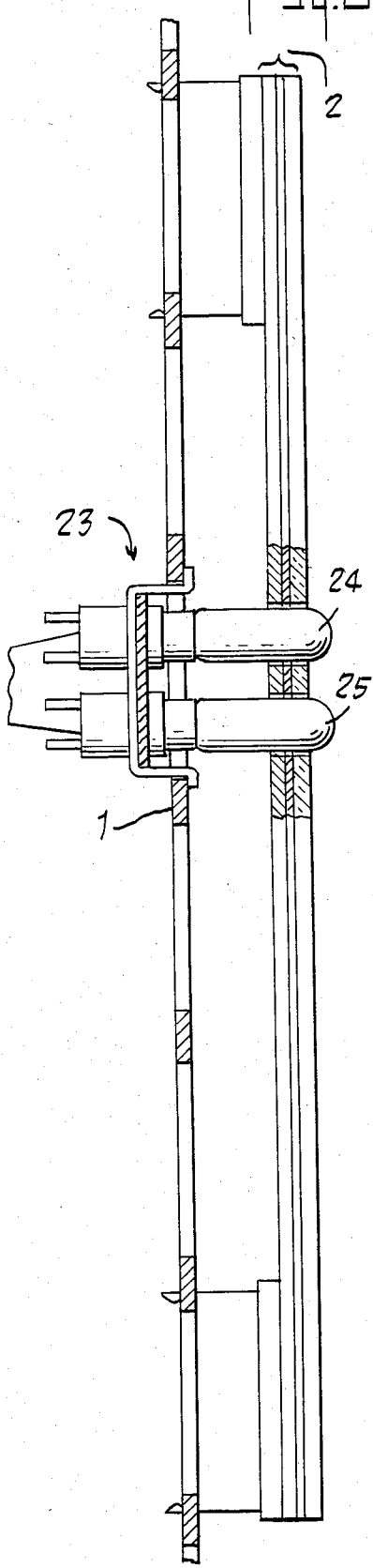
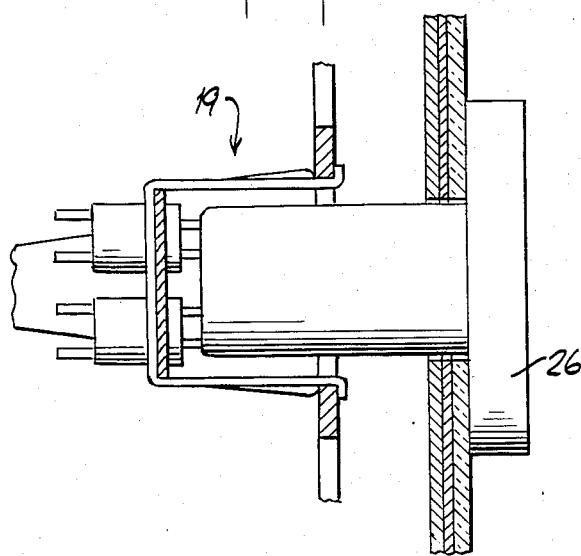
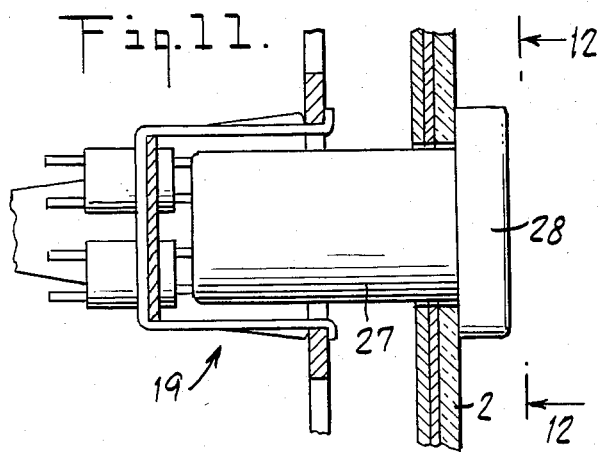
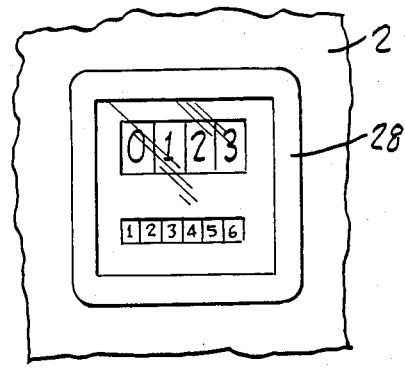

U.S. Patent   Mar. 19, 1985   Sheet 4 of 4   4,505,061
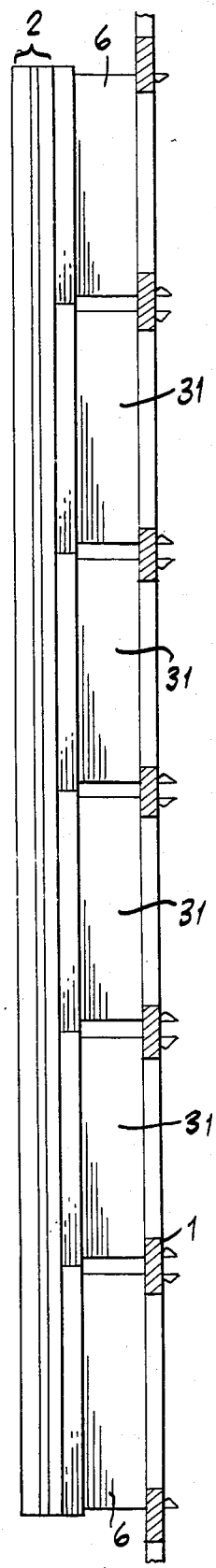
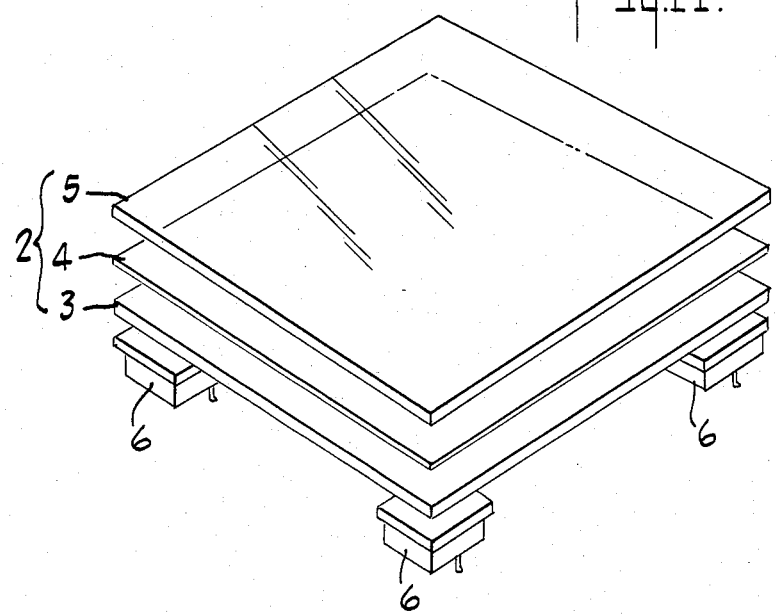
Fig.13.
Fig.14.
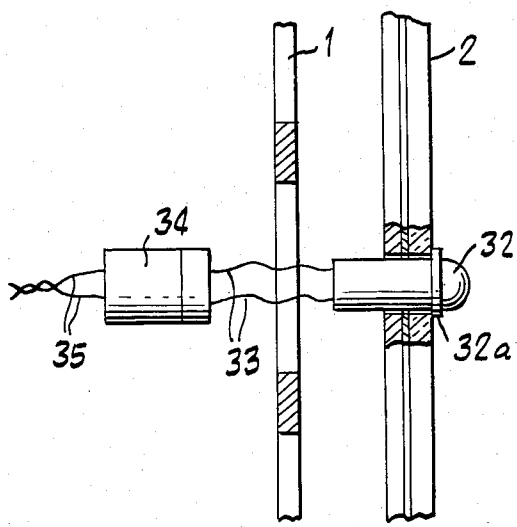
Fig.15.

GRAPHIC DISPLAY

BRIEF SUMMARY OF THE INVENTION

This invention comprises a display especially suitable for a large system, such as a utility distribution network diagram, a map, or the like, which is subject to frequent revision. The particular advantage of the invention is that the complete display is made up of a multiplicity of small display members, arranged in abutting relationship, which can be revised and replaced individually as necessary to keep the entire display up-to-date, without the necessity of replacing the complete display, after each revision. The display members may use computer generated graphics, which may readily be modified to show revisions. The display is usually arranged vertically and comprises a vertical frame including an array of apertures of equal size and shape. A plurality of replaceable display members are mounted on the frame. Each display member is a lamination of three sheets including a base sheet, a display sheet and a transparent cover sheet. Each display member has attached to the base sheet at least one mounting unit, although a plurality of mounting units are preferred. Each mounting unit is removably receivable in one of the apertures in the frame, so that each display member may be readily attached to and removed from the frame.

DRAWINGS

FIG. 1 is a fragmentary elevational view of a display embodying the invention, showing two complete display members and a fragment of a third.

FIG. 2 is a sectional view taken on the line 2—2 of FIG. 1, on an enlarged scale.

FIG. 3 is a rear view of one of the display members of FIG. 1, detached from the frame and showing a mounting unit at each corner.

FIG. 4 is a sectional view taken on the line 4—4 of FIG. 1, showing how the frame is attached to a suitable support.

FIG. 5 is a view showing an arrangement for mounting lamps behind a portion of the display member.

FIG. 6 is a cross-sectional view taken on the line 6—6 of FIG. 5.

FIG. 7 is a sectional view taken on the line 7—7 of FIG. 5.

FIG. 8 is a view partly in elevation and partly in section, showing a modification.

FIG. 9 is a view similar to FIG. 7, showing another different modification.

FIG. 10 is a right-hand elevational view of the modification shown in FIG. 9.

FIG. 11 is a view similar to FIG. 9, but showing another modification.

FIG. 12 is a right-hand elevational view of the modification of FIG. 11.

FIG. 13 is a cross-sectional view taken on the line 13—13 of FIG. 1.

FIG. 14 is an exploded view showing the structure of the display panel.

FIG. 15 is a cross-sectional view similar to FIGS. 7, 9 and 11, showing a further modification.

FIGS. 1-3

These figures show a sign or display mounted on a frame 1 consisting of a grid defining a multiplicity of square apertures 1a, of equal size and equally spaced. Each aperture 1a is defined by four grid elements 1b. Each grid element 1b is provided with a central hole 1c. Mounted on the frame 1 are two individually replaceable display members 2. A fragment of a third display member appears below the lower left corner of the left-hand complete display member. Each of the members is a laminated structure comprising a base sheet 3 (see FIG. 2), a display sheet 4 and a transparent cover sheet 5. The base sheet 3 and the cover sheet 5 may be made of polyester impregnated with Fiberglas so as to be fire resistant. The display sheet 4 is typically paper and may have a map printed thereon as shown at 8 in FIG. 1. The sheets 3, 4 and 5 are bonded together to produce a three-ply lamination. The sheet 4 may be made transparent in certain areas by appropriate treatment of the paper. The base sheet 3, although typically opaque, may also be made transparent, at least in part.

The display members 2 are mounted on the frame 1 by means of four mounting units 6, one at each corner of each display member. Each mounting unit comprises a front plate 6a and four walls 6b integral with the plate 6a and extending rearwardly therefrom. An integral finger 7 projects rearwardly from the middle of the rear side of each wall 6b. The finger 7 is of yieldable material and is insertable through one of the openings 1c in the frame 1 and snaps over the frame element 1b. When all four of the mounting units 6 are snapped in place on the frame, the display member 2 is firmly mounted on the frame but can be readily removed for purposes of replacement and up-dating of the map 5. Each mounting unit 6 has a front surface 6c, which is bonded to the external surface of the base sheet 3. While bonding is preferred, other suitable means of attaching the mounting unit 6 to the base sheet 3 may be employed.

The members 2 need not be square, as shown, but may be irregular. It is preferred to have the peripheral contour of a complete display extend along the center lines of the frame elements.

The displays of the present invention are particularly advantageous for use with large systems which are subject to frequent revision, such as gas, electricity or water distribution systems. Complex wiring diagrams may also be displayed to advantage by the present invention. The invention is useful with large, complex displays of any type where it may be desirable to revise one or more localized parts of the display. It is useful with any display which is subject to changeable input data. The display members, particularly the display sheets 4, may be produced by computer generated graphics and alphanumeric characters. The system of the invention has substantial economic advantages in any system of the type described, since the details of the complete display may be kept up-to-date, without the necessity for reproducing the complete display in order to modify small details.

FIG. 4

This figure shows a stand-off connector 10 which comprises a rod threaded at its back end to receive nuts 11 on the opposite sides of a bracket 12 fixed to a suitable support 13. The front end of the rod 10 is internally threaded to receive a screw 14 which extends through a countersunk hole in the frame 1 and holds the frame 1 in place.

FIGS. 5-7

These figures illustrate a lamp support, generally indicated by the reference numeral 19, for supporting lamps 15 and 16 in back of the frame 1 for illuminating a portion of the display member 2. The lamps are mounted on insulators 17 which extend through two U-shaped stampings 20 and 21. The bights of the U-shaped stampings 20 and 21 are disposed at right angles to each other. The arms of the U-shaped stamping 20 are provided at their outer ends with flanges 20a. By squeezing the sides of the stamping 20, the lamp support 19a may be inserted in an opening 1a in the frame 1. Upon release of those sides, the lamp support 19 is held in place by engagement of the flanges 20a with the frame. Both arms of the U-shaped stamping 21 abut against the back of the frame 1, and one of those arms has a rearward extension 21a (FIG. 6) which extends some distance to the rear of the lamp support 19 and is provided with fingers 21b which may be folded over, as shown, to engage and hold wires 22 connected to the lamps 15 and 16. The fingers 21 thereby take the strain off the wires 22 at their connections with the insulator 17. The lamps 15 and 16 may be of different colors.

FIG. 8

This figure illustrates a different type of lamp support generally indicated at 23. The lamp support 23 is mounted on the frame 1 in a manner generally similar to the mounting of the lamp support 19 in FIGS. 6 and 7. However, the lamp support 23 is shorter and carries a pair of longer lamps 24 and 25 which extend through openings in the display member 2, so that the tips of the lamps are visible at the outside of the display member.

FIGS. 9 AND 10

These Figures illustrate a modification in which the support structure 19 of FIGS. 6 and 7 carries an analog meter 26 which extends outside the display member 2 so that it is readily visible to an observer.

FIGS. 11 AND 12

These figures illustrate another modification in which the support 19 carries a meter 27 having a digital readout 28.

FIG. 13

This figure illustrates an elevational view of the side of the right-hand display member 2 of FIG. 1. The mounting units 6 at the top and bottom of the display member 2 are bonded to that display member, as illustrated in connection with FIG. 2. Between the mounting units 6 are placed four filler units 31, which close the gap between the display member 2 and the frame 1, but which are not bonded to the display member. The filler units 31 are provided for aesthetic purposes, to give a more finished appearance to the outside periphery of a complete sign, comprising a large number of display members 2.

FIG. 14

This figure illustrates the construction of the display member 2, including the base sheet 3, the display sheet 4 and the transparent cover sheet 5. After those three sheets are laminated together, the mounting units 6 are attached to the base sheet 3, at its under side, as shown in this figure.

FIG. 15

This figure shows a further modification in which a different type of variable display means is provided comprising a lamp 32 received in an appropriate aperture in the display member 2. The lamp 32 has a flange 32a which abuts against the outside of the display member 2. Wires 33 connected to the lamp extend through an opening in the frame 1 and through a connector 34 to slack wires 35. There is a sufficient amount of slack in the wires 35 to permit removal of the display member 2 from the frame 1. The connector 34 may be thereafter separated. The lamp 32 may be either an incandescent lamp or a light emitting diode.

We claim:
1. A sign, comprising:
a. an array of individually replaceable display members constituting said sign when placed in a coordinated abutting relationship, each display member comprising a base sheet, a display sheet carrying a portion of the sign and a transparent cover sheet, said sheets being bonded together with the display sheet between the base sheet and the cover sheet;
b. a frame comprising a rectangular grid of elements having flat front surfaces, said grid defining an array of apertures of equal size, each said aperture being rectangular and being defined by four grid elements;
c. a plurality of mounting units, each comprising a rectangular plate wide enough to overlap the grid elements on each side of one of said rectangular apertures, and having four walls projecting rearwardly from the plate and integral therewith to engage the four grid elements defining the aperture, at least two of said walls having flexible fingers integral therewith and projecting through holes in the grid elements, said fingers being yieldable to grip the grid elements and hold the mounting unit in place on the frame with the member spaced from the grid by the walls on the mounting units;
d. the plate on each mounting unit has a front surface bonded to the base sheet on one of said display members; and
e. each display member has at least one mounting unit attached to its base sheet so that the display member may be readily attached to and removed from the frame.
2. A sign as in claim 1, including:
a. a plurality of filler units of the same dimensions as the mounting units along all the peripheral edges of the sign in the space between the members and the grid.
3. A sign, comprising:
a. an array of individually replaceable display members constituting said sign when placed in a coordinated abutting relationship;
b. a frame (1) comprising a grid of spaced elements (1b) having flat front surfaces, with holes (1c) in said elements opening from said front surfaces, said grid defining an array of apertures (1a) between said elements;
c. a plurality of mounting units releasably supporting said members on said frame, each mounting unit comprising a plate wide enough so that its margins extend in front of the grid elements on the sides of one of said apertures, and walls integral with the plate, located inwardly from the edges of the plate and extending rearwardly therefrom to abut the grid elements on the sides of said one aperture;
d. each mounting unit having flexible fingers projecting rearwardly from said walls and receivable in the holes in the grid elements, said fingers yieldably gripping the grid elements when so received so as to hold the mounting unit on the grid, each hole in a grid element being large enough to receive two flexible fingers, one from each of two adjacent mounting units; and e. each display member extending in front of a plurality of said apertures in the frame and having at least one mounting unit attached thereto so that the display member may be readily attached to and removed from the frame.

4. A sign, comprising:

a. an array of individually replaceable display members constituting said sign when placed in a coordinated abutting relationship, each display member comprising a base sheet, a display sheet carrying a portion of the sign and a transparent cover sheet, said sheets being bonded together with the display sheet between the base sheet and the cover sheet;

b. a frame comprising a grid of elements having flat front surfaces, said grid defining an array of equal polygonal apertures each said aperture being defined by a plurality of grid elements equal in number to the number of sides of the polygonal aperture;

c. a plurality of mounting units, each comprising a polygonal plate having a number of sides equal to the number of sides of one of said apertures, said plate being wide enough to overlap a portion of the grid elements on all sides of one of said apertures, and walls integral with the plate and equal in number to the number of sides of one of said apertures, said walls extending rearwardly from the plate to engage the grid elements on all sides of an aperture, at least two of said walls on each mounting unit having flexible fingers integral therewith and projecting through holes in the grid elements, said fingers being yieldable to grip the grid elements, and hold the mounting unit in place on the frame with the member spaced from the grid by the walls on the mounting units;

d. the plate on each mounting unit has a front surface bonded to the base sheet on one of said display members; and e. each display member has at least one mounting unit attached to its base sheet so that the display member may be readily attached to and removed from the frame.

* * * * *